(12) United States Patent
Bates et al.

(10) Patent No.: US 6,335,682 B1
(45) Date of Patent: Jan. 1, 2002

(54) METHOD AND SYSTEM FOR ENHANCED SYSTEM AUTOMOTIVE BRAKE LIGHT CONTROL

(75) Inventors: Cary Lee Bates; Paul Reuben Day, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/610,299

(22) Filed: Jul. 5, 2000

(51) Int. Cl.[7] .............................................. B60Q 1/44
(52) U.S. Cl. ....................... 340/479; 340/435; 340/903
(58) Field of Search ................................. 340/479, 901, 340/903, 435, 436

(56) References Cited

U.S. PATENT DOCUMENTS 3,793,621 A * 2/1974 McIntosh .................... 340/901

* cited by examiner

*Primary Examiner*—Edward Lefkowitz
(74) *Attorney, Agent, or Firm*—Bracewell & Patterson, LLP

(57) ABSTRACT

A method and system for enhanced automotive brake light control for use in a vehicle having brake pedal actuated brake lights. Photosensors mounted on the front of an automobile are filtered and positioned to detect brake lights which are illuminated on other vehicles in traffic in front of that automobile. Approximate ranges to detected pairs of brake lights are determined based upon a perceived distance between each brake light in a detected pair. Thereafter, in response to detection of sudden increases in light intensity by a pair of brake lights within a predetermined approximate range, the brake lights of the equipped automobile are temporarily illuminated, without brake pedal actuation, such that a potential braking situation is communicated to vehicles behind the equipped automobile.

5 Claims, 4 Drawing Sheets

METHOD AND SYSTEM FOR ENHANCED SYSTEM AUTOMOTIVE BRAKE LIGHT CONTROL

BACKGROUND OF THE INVENTION

1. Technical Field

The present invention relates to improved automotive safety systems and in particular to an enhanced automotive brake light control system. Still more particularly the present invention relates to an enhanced automotive brake light control system which warns vehicles behind an equipped vehicle of potential braking situations prior to action by the driver of the equipped vehicle.

2. Description of the Related Art

Automotive safety is an important issue in the modern world. It is not uncommon for a greater number of people in the United States to be killed in automobile accidents than by any other activity. Consequently, those having skill in this art will appreciate that the federal government and safety authorities are constantly attempting to improve the inherent safety of automobiles manufactured in the United States.

As example, it should be noted that at one time seat belts were not required within automobiles. The art and technology of seat belts have been enhanced from simple lap belts to three point shoulder harnesses with automatic tensioning devices and motorized actuators which reposition the seat belt after a passenger has entered the automobile.

Similarly, advances in crash worthiness, safety glass and passenger protection devices, such as air bags, have also rapidly evolved in recent years.

One fundamental safety feature of the modern automobile which is often overlooked are the lights and signaling devices provided with the vehicle. Federal regulations mandate specified size, mounting positions and visibility for brake lights and turn signals in order to warn passengers in the vicinity of a vehicle so equipped of the intention of the driver of that vehicle. However, the recent advent of increased popularity of larger and larger vehicles, such as sport utility vehicles (SUVs), have severely limited the visibility of automobiles in the vicinity of such vehicles. For example, a driver behind a sport utility vehicle (SUV) in an economy or compact car suffers from almost total sensory deprivation with respect to conditions and activities in the roadway in front of the sport utility vehicle (SUV). A similar situation occurs when driving in the vicinity of large transport vehicles.

Consequently, those having skill in the art should appreciate that a method and system whereby the existence of potential braking situations in front of a vehicle which blocks visual access to the roadway would greatly enhance safety in the automotive area.

SUMMARY OF THE INVENTION

It is therefore one object of the present invention to provide an improved automotive safety system.

It is another object of the present invention to provide an enhanced automotive brake light control system.

It is still another object of the present invention to provide an enhanced automotive brake light control system which warns vehicles behind an equipped automobile of potential braking situations prior to any action by the driver of the equipped automobile.

The foregoing objects are achieved as is now described. The method and system of the present invention may be utilized to provide enhanced automotive brake light control in vehicles having brake pedal actuated brake lights. Photosensors mounted on the front of an automobile are filtered and positioned to detect brake lights which are illuminated on other vehicles in traffic in front of that automobile. Approximate ranges to detected pairs of brake lights are determined based upon a perceived distance between each brake light in a detected pair. Thereafter, in response to detection of sudden increases in light intensity by a pair of brake lights within a predetermined approximate range, the brake lights of the equipped automobile are temporarily illuminated, without brake pedal actuation, such that a potential braking situation is communicated to vehicles behind the equipped automobile.

BRIEF DESCRIPTION OF THE DRAWINGS

The novel features believed characterics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
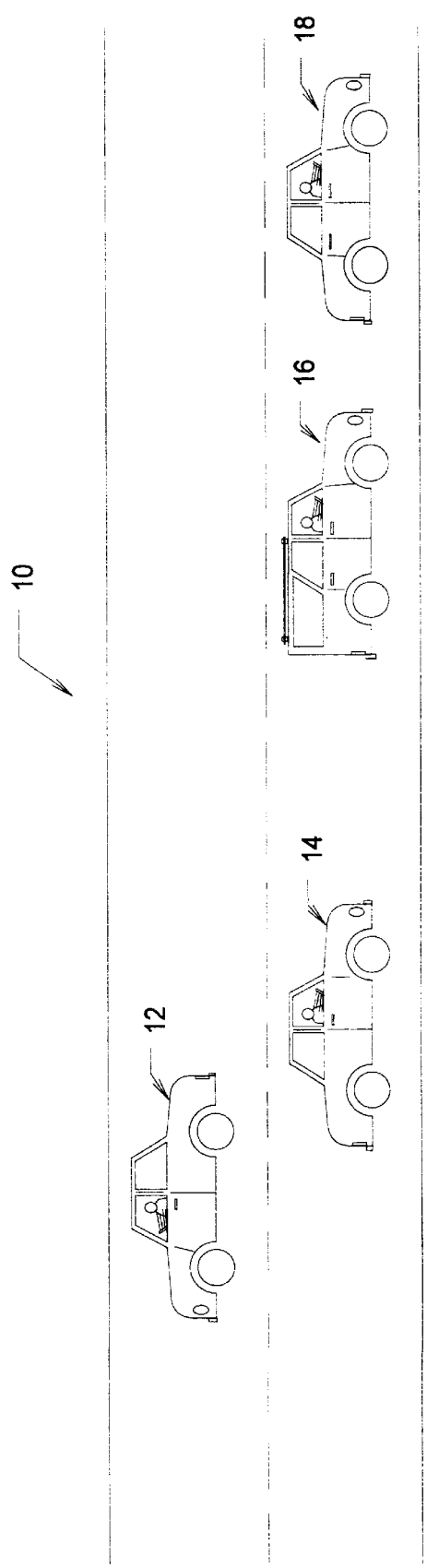
FIG. 1 is a pictorial representation of a highway section Including vehicles which may utilize the method and system of the present invention.

With reference now to the figures, and in particular with reference to FIG. 1, there is depicted a highway section 10 upon which multiple automobiles and other vehicles may travel. As depicted, automobile 12 is being driven in a first direction and automobile 14 and 18 and sport utility vehicle (SUV) 16 are being driven in the other direction. As may be appreciated, the driver of automobile 14, driving behind sport utility vehicle (SUV) 16, may not be able to visually detect the brake lights or turn signals of automobile 18, due to the immense size of modern sport utility vehicles, such as sport utility vehicle (SUV) 16. Consequently, it would be an enhancement to automotive safety if a warning of a potential braking situation enhanced by automobile 18 could be provided for the driver of automobile 14.

Figure 2:
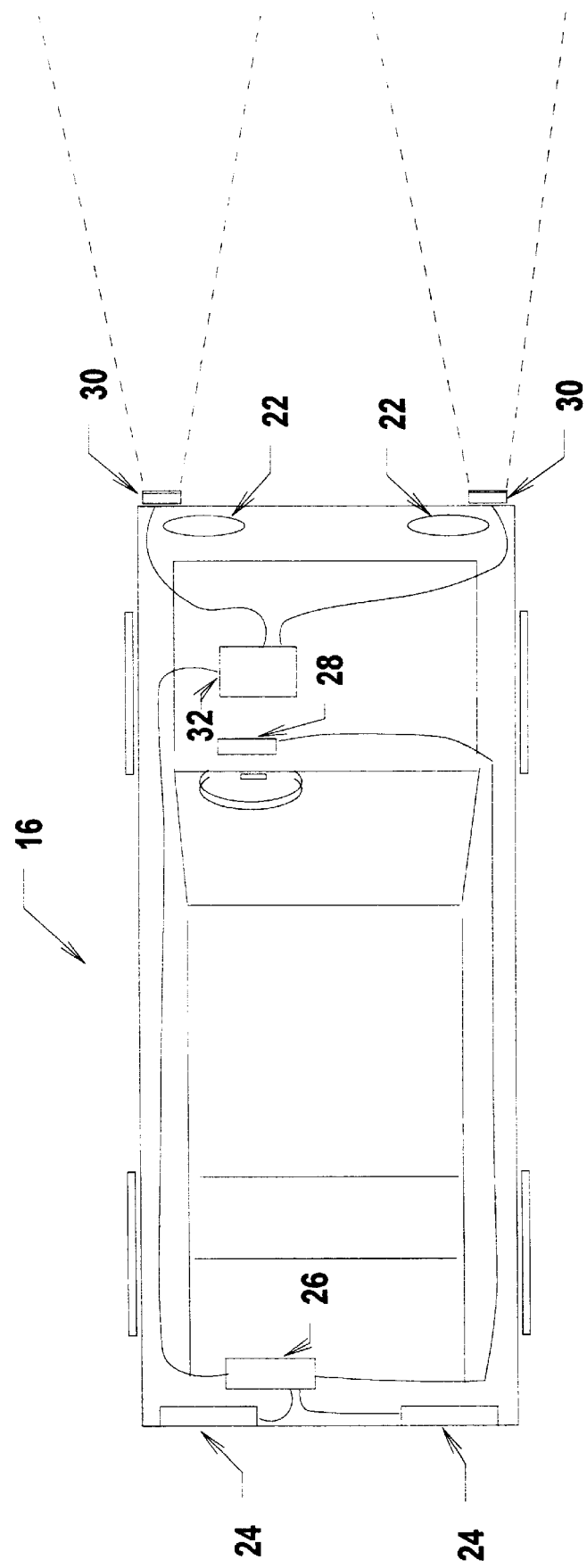
FIG. 2 is a partially pictorial schematic representation of the enhanced automotive brake light control system of the present invention.

Referring now to FIG. 2, there is depicted a partially pictorial schematic representation of the enhanced automotive brake light control system of the present invention. As illustrated, sport utility vehicle (SUV) 16 includes standard automotive equipment, not all of which is illustrated for purposes of clarity. However, a pair of headlights 22 and brake lights 24 are schematically depicted. Although it is common for automobiles to include both brake lights and tail lights, the tail lights of sport utility vehicle (SUV) 16 are not depicted.

As is the standard in automotive vehicles manufactured in recent years, the light sources within brake lights 24 are illuminated temporarily in response to depression of the brake pedal within sport utility vehicle (SUV) 16 by means of brake pedal actuator 28. Brake pedal actuator 28 may comprise a simple momentary contact electrical switch which is mechanically linked to the brake pedal (not shown) of sport utility vehicle (SUV) 16 in a manner well known in the art. Electrical cabling from brake pedal actuator 28 is then routed to brake light relay 26 and utilized to provide temporary electrical power to brake lights 24. Thus, each time the driver of sport utility vehicle (SUV) 16 depresses the brake pedal within that vehicle, brake pedal actuator 28 sends an electrical signal to brake light relay 26, causing electrical power to be applied to brake lights 24, indicating to vehicles behind sport utility vehicle (SUV) 16 that the brakes in this vehicle have been applied.

In accordance with an important feature of the present invention, a pair of photosensors 30 are mounted to the front of sport utility vehicle (SUV) 16 and filtered and focused directly in front of sport utility vehicle (SUV) 16 in a manner calculated to detect the location and intensity of brake lights mounted on vehicles in front of sport utility vehicle (SUV) 16. As will be explained in greater detail herein, a single photosensor may be utilized and appropriate mounting and filtration is preferably utilized in order to enhance the sensitivity of photosensors 30 to the wavelength of light typically emitted by automotive brake lights.

Still referring to FIG. 2, as depicted therein, an electrical cable is routed from each photosensor 30 to processor 32. Processor 32 utilizes the outputs of each photosensor 30, in a manner which will be explained in greater detail herein, and generates a control signal in response thereto. That control signal is routed, via an electrical cable, to brake light relay 26 and can, in accordance with the method and system of the present invention, serve to illuminate brake lights 24 without depression of brake pedal actuator 28. In this manner, as will be explained in greater detail below, the presence of illuminated brake lights in front of sport utility vehicle (SUV) 16 may be utilized to temporarily and automatically illuminate the brake lights of sport utility vehicle (SUV) 16 without any interaction by the driver thereof, shortening the delay which typically occurs as a result of reaction times by drivers, so that drivers in vehicles behind sport utility vehicle (SUV) 16 may learn of a potential braking situation more quickly.

Figure 3:
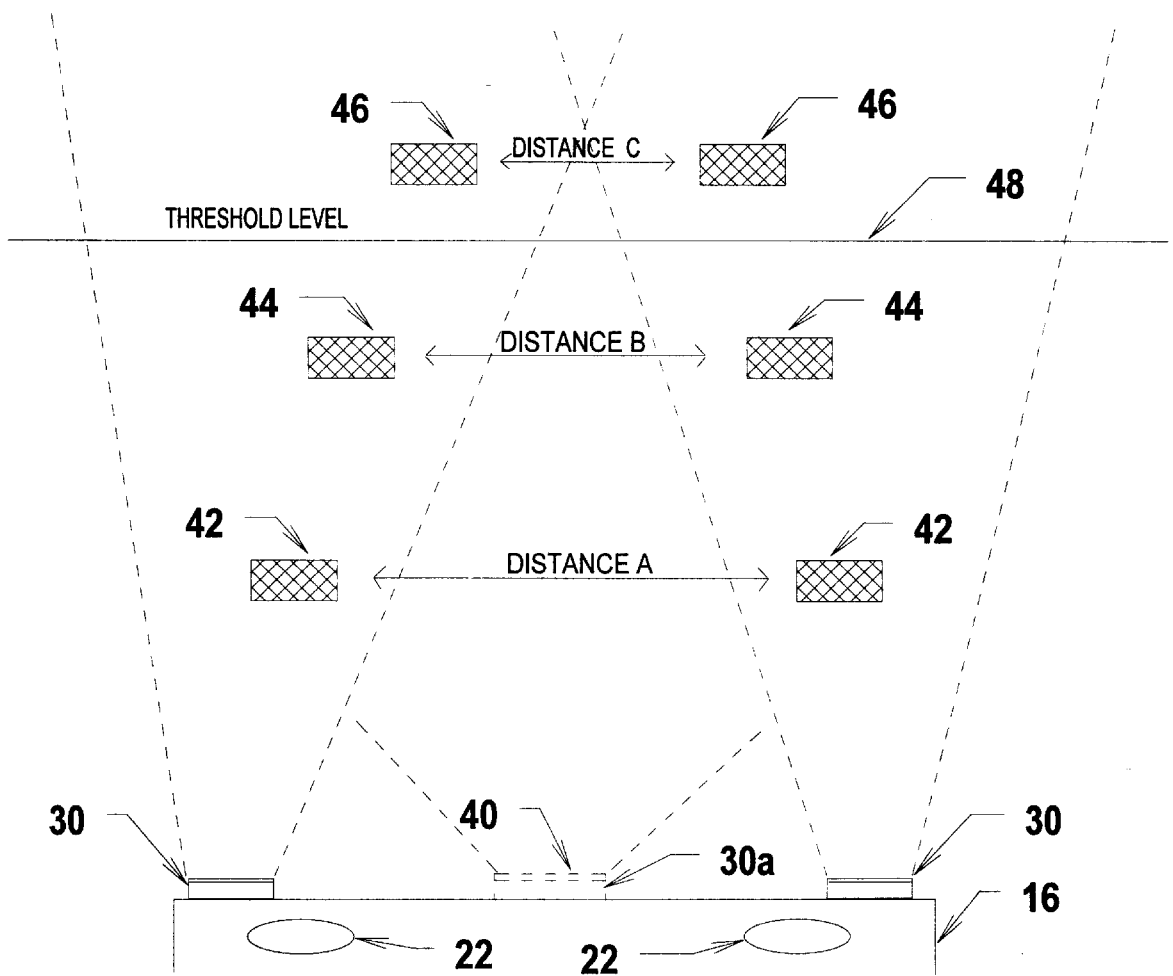
FIG. 3 is a schematic representation of brake light detection utilizing the method and system of the present invention.

With reference now to FIG. 3, there is depicted a schematic representation of brake light detection utilizing the method and system of the present invention. As illustrated, each photosensor 30 is mounted, filtered and positioned in order to detect brake lights present in front of sport utility vehicle (SUV) 16. Optionally, as depicted in FIG. 3, a single photosensor 30a may be utilized in an alternate embodiment of the present invention, in place of the mounted pair of photosensors 30. Additionally, as depicted with respect to photosensor 30a, a light filter 40 may be provided to enhance the detectability of brake lights by a photosensor by enhancing the detectability of red light waves emitted by brake lights.

As illustrated, photosensors 30 may then be utilized to detect pairs of automotive brake lights such as automotive brake lights 42, automotive brake lights 44, or automotive brake lights 46 within an image generated by photosensors 30. As should be apparent upon referral to the present illustration, the range between photosensors 30 and each pair of detected brake lights may be approximated utilizing the knowledge that the distance between brake lights for an average automobile is relatively standard. Of course, small compact sport cars will have their brake lights mounted more proximate to each other and care should be taken to ensure that this measurement is considered.

As depicted in FIG. 3, the distance between each pair of brake lights will diminish as each detected pair of brake lights is located farther and farther from photosensors 30. As illustrated, automotive brake lights 42 are perceived to be separated by Distance A, automotive brake lights 44 are perceived to be separated by Distance B, and automotive brake lights 46, located the greatest distance away, are perceived to be separated by Distance C, where C<B<A. A selected minimum range or threshold level 48 is predetermined so that the presence of illuminated brake lights beyond that threshold level will not initiate the method and system of the present invention. In an alternate embodiment, the distance to a pair of brake lights may be determined utilizing radar or sonar type systems.

Figure 4:
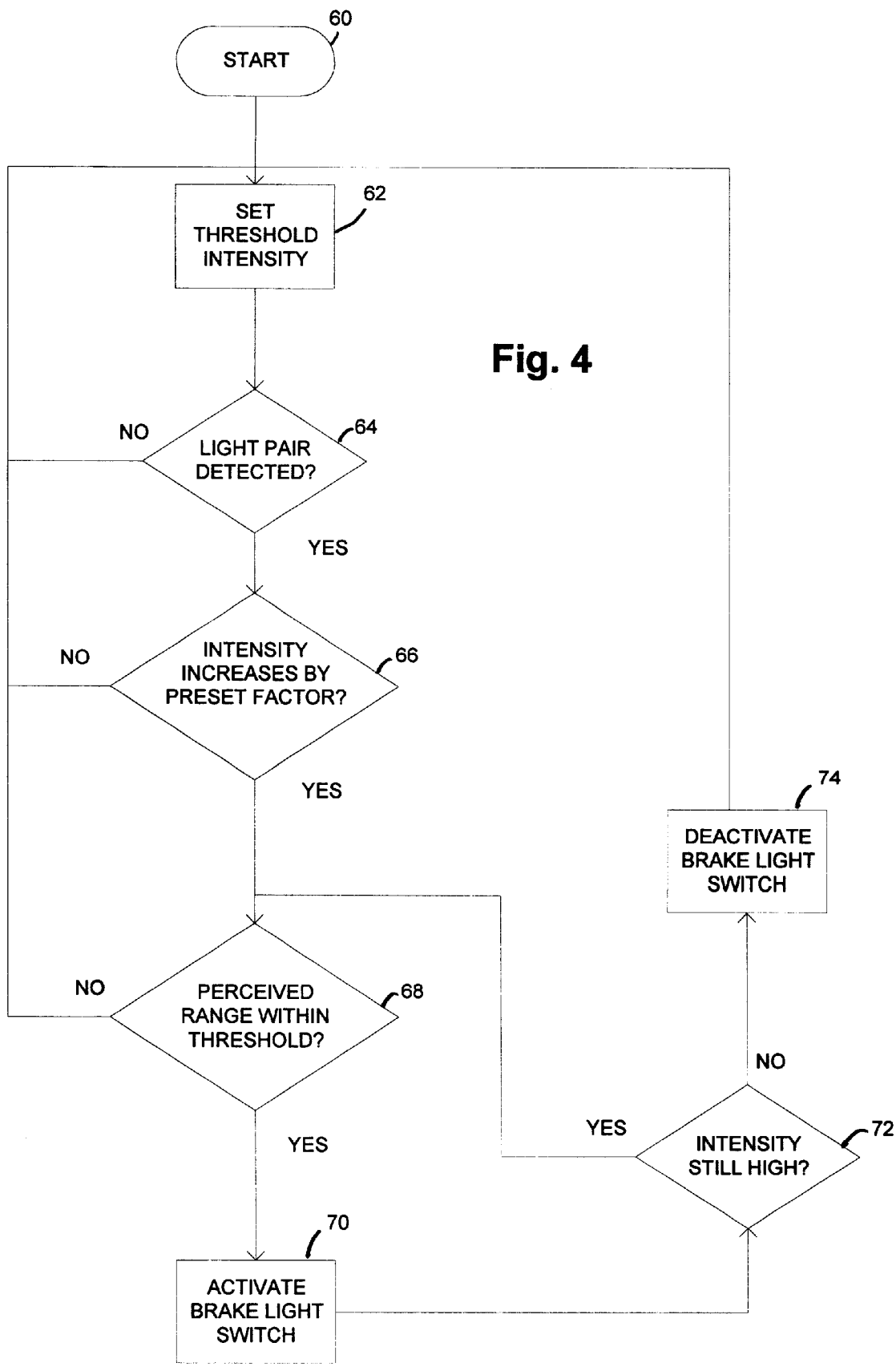
FIG. 4 is a high level logic flowchart illustrating a process (for implementing the method of the present invention.

Finally, with respect to FIG. 4, there is depicted a high level logic flowchart which illustrates a process for implementing the method of the present invention as described above. As illustrated, this process begins at block 60 and thereafter passes to block 62. Block 62 illustrates the setting of a threshold intensity. Of course, those skilled in the art will appreciate that a predetermined standard threshold intensity may be utilized in place of the active threshold intensity determination described herein. During daylight hours, an ambient threshold level may be selected so that illumination of brake lights can be easily detected. However, during night hours, the ambient threshold level must be selected so that constantly illuminated tail lights are not confused with brake lights. Daylight/night determinations may be made by detecting ambient light or by determining whether or not the head lights are illuminated.

Still referring to block 62, in the event a pair of brake lights have been detected, the process passes to block 64. Block 64 illustrates a determination of whether or not a brake light pair has been detected and if not, the process merely returns to the input to block 62 in an iterative fashion to set a threshold intensity and await detection of a pair of brake lights. Next, the process passes to block 66. Block 66 illustrates a determination of whether or not the intensity of a detected pair of brake lights has increased by some preset factor. This increase may be detected by comparing the intensity of the detected pair of brake lights to the threshold intensity which was dynamically set in step 64 or to a predetermined threshold intensity which has been set by the manufacturer of the system of the present invention. If the intensity of the detected pair of brake lights does not increase, the process returns, in an iterative fashion, to block 62 to await detection of a subsequent pair of brake lights.

Still referring to block 66, in the event the intensity of the detected pair of brake lights does increase by the preset factor, the process passes to block 68. Block 68 depicts a determination of whether the perceived range to the detected pair of brake lights is within the preset threshold. If the perceived range of the detected pair of brake lights is not within the preset threshold, then a potential braking situation in all probability is not imminent and the process returns to block 62, in an iterative fashion, as described above.

Still referring to block 68, in the event the perceived range to a detected pair of brake lights is within the preset threshold, the process passes to block 70. Block 70 illustrates the activation of a brake light switch in order to temporarily illuminate the brake lights of the equipped automobile, without requiring the driver thereof to actuate the brake pedal of that vehicle. Although this process step describes a "brake light switch" those having skill in the art will appreciate that a relay, transistor or other switching device may be utilized to accomplish this step so long as a means is provided for temporarily providing electrical power to the brake lights of the equipped automobile. Next, the process passes to block 72. Block 72 depicts a determination of whether the intensity of the detected pair of brake lights is still high and if so, the process returns to block 68, in an iterative fashion, to once again determine whether or not the detected pair of brake lights is within the preset threshold.

Referring again to block 72, in the event the intensity of the detected pair of brake lights has diminished, the process passes to block 74. Block 74 illustrates the deactivation of the brake light switch. Alternatively, the activation of the brake light switch depicted within block 70 may be programmed to occur for some predetermined interval, such as one second, and then deactivation of the brake light switch will not be necessary. However, after deactivating the brake light switch as depicted in block 74, the process returns to block 62 to await detection of a subsequent pair of brake lights.

Upon reference to foregoing, those skilled in the art will appreciate that the inventors herein have created a system in which the lack of visibility beyond a large vehicle interposed between a driver and the road ahead will not prevent the driver of the car from rapidly receiving information regarding potential braking situations in front of that vehicle, despite the size thereof. This system then greatly enhances the overall safety of driving situations. While the invention has been particularly shown and described with reference to a preferred embodiment, it will be understood by those skilled in the art that various changes in form and detail may be made therein without departing from the spirit and scope of the invention.

What is claimed is:

1. An enhanced automobile brake light system in use in a vehicle having brake pedal actuated brake lights, said system comprising:

at least one sensor for detecting a location and intensity of a pair of red lights located in front of a first vehicle;

a processor coupled to said at least one sensor for identifying a potential braking situation based upon both an increase in the intensity of a detected pair of red lights and a distance between said detected pair of red lights indicative of a range to said detected pair of red lights which is less than a predetermined threshold range for generating a control signal in response to said identification; and a brake light switch coupled to said processor for temporarily illuminating the brake lights of said first vehicle without brake pedal actuation such that a potential braking situation is communicated to a second vehicle behind said first vehicle.

2. The enhanced automotive brake light system according to claim 1, wherein said at least one sensor detects a location and intensity of pairs of red lights.

3. The enhanced automotive brake light system according to claim 1, wherein said at least one sensor comprises a pair of spaced apart photosensitive detectors mounted in front of said first vehicle.

4. The enhanced automotive brake light system according to claim 3, wherein each of said pair of spaced apart photosensitive detectors includes a filter for enhancing light wavelengths associated with automotive brake lights.

5. A method for enhanced brake light control in a vehicle having a brake pedal actuated brake lights, said method comprising the steps of:

detecting a location and intensity of pairs of red lights located in front of a first vehicle;

identifying a potential braking situation based upon both an increase in the intensity of a detected pair of red lights and a distance between said detected pair of red lights indicative of a range to said detected pair of red lights which is less than a predetermined threshold range;

illuminating the brake lights of said first vehicle without brake pedal actuation in response to an identification of a potential braking situation such that a potential braking situation is communicated to a second vehicle behind said first vehicle.

* * * * *